Sept. 24, 1946.        B. A. DIEBOLD        2,408,253
GUARD OR PROTECTOR FOR ELECTRIC CABLES
Filed Aug. 27, 1943
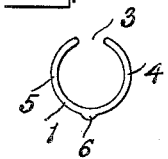
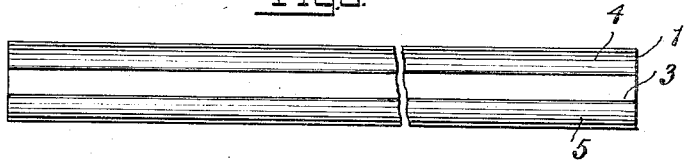
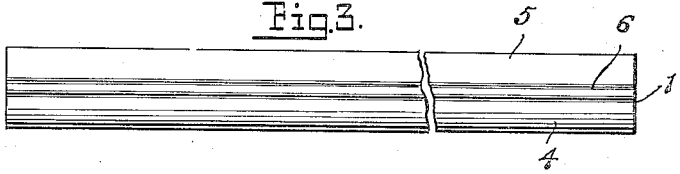
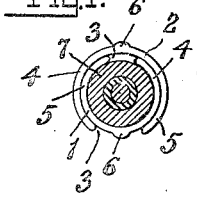
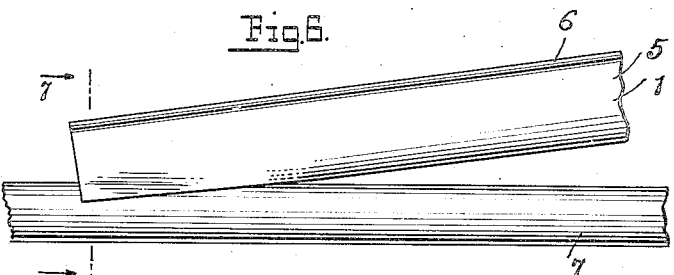
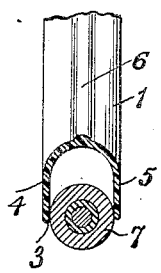
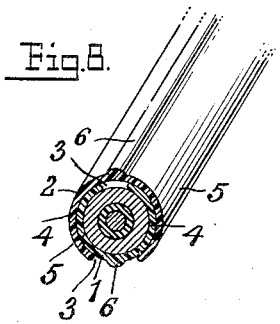
INVENTOR.
Barney A. Diebold
BY
Harry Radzinsky
Attorney Patented Sept. 24, 1946

2,408,253

UNITED STATES PATENT OFFICE 2,408,253

GUARD OR PROTECTOR FOR ELECTRIC CABLES

Barney A. Diebold, Irvington, N. J.

Application August 27, 1943, Serial No. 500,221

1 Claim. (Cl. 174—136)

This invention relates to guards or protectors for electric cables, and particularly to that type of device intended to protect electric wires or cables from abrasion and resultant short-circuit caused by constant rubbing contact with trees or other objects.

At the present time, various types of protectors are used, some of which are made of wood, porcelain, and other materials, and which require considerable effort to apply and maintain. An object of the present invention is to provide a protector or guard which can be made from plastic material and thus manufactured speedily and economically; which can be easily applied in position on the cable without the use of tools and by a lineman wearing protective gloves; which requires no means for securing it in position other than its inherent resiliency and shape; and which has complete insulating characteristics and which will effectively protect the cable from damage by abrasion.

More particularly, the invention contemplates a protective sleeve composed of two interfitting and overlapping sleeve members made of plastic material or the like having a resiliency permitting one of them to be sprung or snapped into position around the electric cable, and the other member to be sprung over the inner one to co-operate therewith in forming a self-maintaining tubular enclosure around the cable to protect the insulation of the cable from becoming worn or frayed.

In the accompanying drawing, wherein an embodiment of the invention is shown, Fig. 1 is an end view of one of the sleeve members; Fig. 2 is a top plan view of the same; Fig. 3 is a plan view of the sleeve with the rib or bead thereon located uppermost; Fig. 4 is an end view of the two sleeves, constituting the complete guard, in position around a cable; Fig. 5 is a side view of the same; Fig. 6 shows one of the sleeves being fitted over an electric cable; Fig. 7 is a sectional view on the line 7—7 of Fig. 6, looking in the direction of the arrows, and Fig. 8 is a sectional view in perspective of the guard in place around a cable.

The improved protector or guard consists of two interfitting members or split sleeves of similar shape and construction, designated at 1 and 2 in the drawing. Each of these members is substantially C-shaped in cross section, thus being longitudinally split as indicated at 3. Located diametrically opposite to the split 3, and extending radially from the outer face of the sleeve, is a projecting rib or bead 6 which preferably extends continuously for the full length of the sleeve. This rib or bead 6 not only materially stiffens the sleeve but also co-operates in restricting rotative movement of one sleeve upon the other, as will be hereinafter explained.

The two sleeves employed are each made from suitable insulating material, such as one of the many plastic materials available, an example of a satisfactory one being the cellulose ester moulding composition of the Tennessee Eastman Corporation which is commercially sold under the trade name of "Tenite." A requisite of the material employed is that it shall be of sufficient resilience to enable its two opposite sides, indicated respectively at 4 and 5, to be spread or sprung apart sufficiently to enable the sleeves to be sprung over and around the electric cable 7 or other cylindrical object which it is to embrace, and to enable it to spring back into its normal shape to closely hug or embrace the cable. It is desirable also that the material employed in the sleeves shall have considerable toughness and resistance to abrasion so that it will be able to withstand a great deal of rubbing or frictional contact with trees or other objects with which the sheathed cable may be brought into contact.

Each of the sleeves may be made in any suitable length, which is readily done, since the sleeves being each of one-piece construction and of plastic material, are readily produced in quantity and in any required length by known extrusion processes.

The manner in which the two interfitting sleeves are applied is clearly indicated in Figs. 6 and 7. Starting the application of one of the sleeves at one of its ends, the sides 4 and 5 of the sleeve are spread apart or distended sufficiently to enable them to be passed around the cable 7, and the sleeve is progressively forced downward by manual force around the cable. Its normal resiliency, as heretofore pointed out, is such as to cause the sleeve to spring or snap in place around the cable and to closely hug or embrace it. When one of the sleeves has been fitted into position as above described, the second sleeve is applied over it in similar fashion, namely, by spreading the sides 4 and 5 of the second sleeve to start them over the first or inner sleeve then positioned on the cable. It will be observed that in applying the second or outer sleeve that it is applied oppositely to the first or in such a way that the split portion 3 of the inner sleeve is covered and concealed by the body of the outer sleeve, and the split portion of the outer sleeve exposes the rib or bead 6 of the inner sleeve. The rib or bead 6 of the inner sleeve, being thus located in the split portion of the outer sleeve, acts as a stop to prevent rotative movement of the outer sleeve relatively to the inner one.

With the arrangement shown, the ribs or beads 6 on both of the sleeves are exposed and not only serve to stiffen the sleeves but to provide surfaces of substantial thickness to resist abrasion.

Since the sleeves can be fitted into position on the cable without the use of tools and since they extend around more than one-half of the circumference of the cable and are held in position thereon without fastening elements, the placement of the two-piece guard in position is effected simply and speedily and can be performed by a lineman wearing rubber gloves. The natural resiliency of the sleeves enables them to securely grip the cable and maintain their position thereon. The frictional engagement of the sleeves with the covering of the cable and the tightness of engagement of the sleeves with the cable is such as to prevent longitudinal shifting of the guard so that when it is once placed in position over a selected stretch of cable it will remain thereon indefinitely.

While I have shown one embodiment of the invention, it is obvious that it may be materially modified without departing from the spirit of the invention as expressed in the claims appended hereto.

What I claim is:

A guard for electric cables and the like comprising, a lengthy C-shaped resilient, plastic-material sleeve having its walls spaced apart at their edges for a distance less than the diameter of an electric cable to be accommodated within the sleeve whereby said walls must be sprung apart to enable the sleeve to be fitted around the electric cable and the springiness of said walls will cause them to fit the sleeve sungly around the cable, a similarly shaped sleeve fitted over the outside of the first sleeve, the second sleeve being fitted on the outside of the first sleeve after the first sleeve has been fitted around the cable, the outer sleeve having its split portion located diametrically opposite to that of the first sleeve when the outer sleeve is fitted over the same, the first sleeve having a rib extending longitudinally for its length and projecting radially from its outer surface and disposed between the sides of the outer sleeve to thereby prevent rotative movement of the outer sleeve on the first sleeve.

BARNEY A. DIEBOLD.